April 12, 1938.   A. BOKEMÜLLER   2,113,979

SCAVENGING OF TWO-STROKE INTERNAL COMBUSTION ENGINES

Filed Nov. 29, 1935   2 Sheets-Sheet 1

Inventor

Alfred Bokemüller

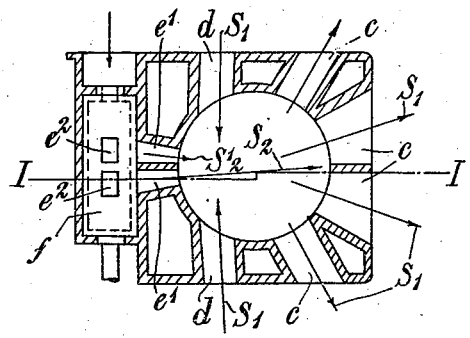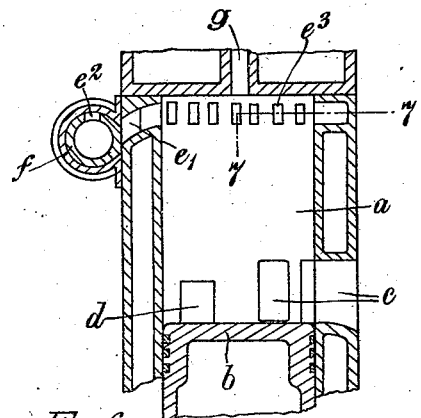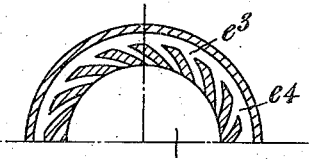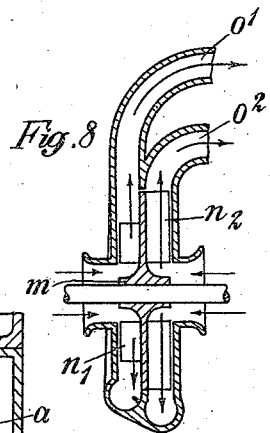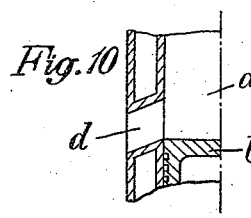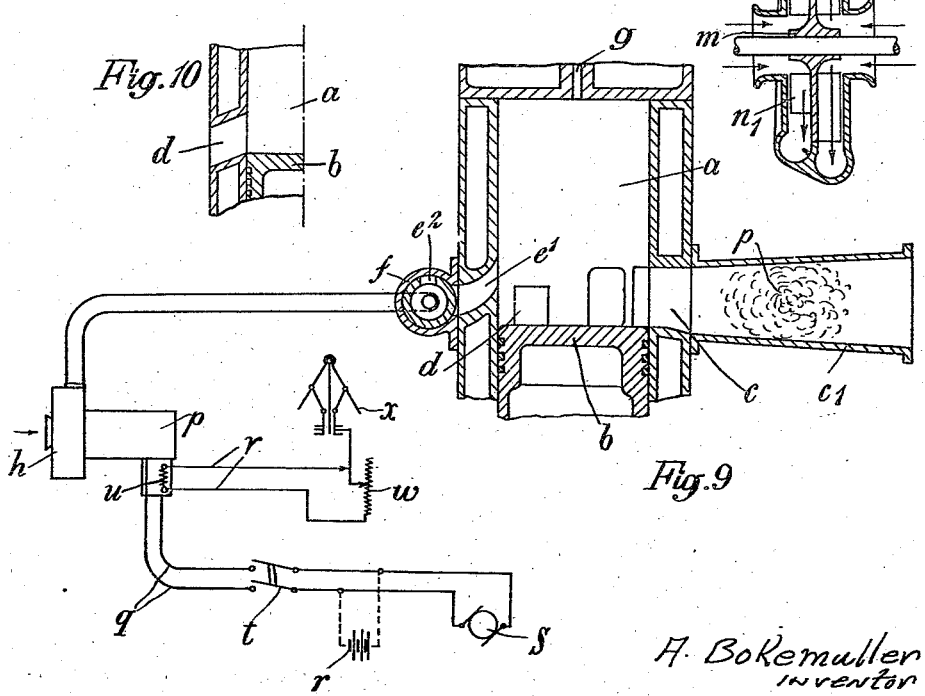

Patented Apr. 12, 1938

2,113,979

UNITED STATES PATENT OFFICE 2,113,979

SCAVENGING OF TWO-STROKE INTERNAL COMBUSTION ENGINES

Alfred Bokemüller, Gaggenau, Germany, assignor, by mesne assignments, to Sir W. G. Armstrong Whitworth & Co. (Engineers) Limited, Newcastle-upon-Tyne, England Application November 29, 1935, Serial No. 52,237
In Germany December 1, 1934

11 Claims. (Cl. 123—65)

This invention relates to two-stroke internal combustion engines of the kind in which the scavenging is effected by means of a main scavenging stream and an additional scavenging stream which is admitted to the cylinder at the end of the exhaust period towards the end of or after the termination of the flow of the main scavenging stream.

The object of the present invention is to render the scavenging of the cylinder as complete as possible by eliminating blind spots and eddying masses of hot combustion gases, which would prevent the fresh charge from reaching all parts of the cylinder and leave a certain portion of the useful volume filled with the residual gases which, by giving off heat to the fresh charge, detrimentally reduce the weight of the charge and thereby reduce the effective pressure during the next power stroke. With this object in view, the present invention consists in this that the inlet openings for the additional scavenging air are located in the neighbourhood of the lower dead centre of the piston and are directed towards the peripheral edge of the cylinder head so that the additional scavenging stream flows without rotation about the cylinder axis towards the peripheral corner of the cylinder space at the cylinder head so as to sweep out the residual exhaust gases located at the said peripheral corner.

According to a further feature of the invention the exhaust openings and the inlet openings for the main scavenging stream are located in the neighbourhood of the lower dead centre of the piston and the inlet openings for the main scavenging stream are directed towards the cylinder head, so that the main scavenging stream flows towards the cylinder head and its direction of flow is reversed before flowing towards the exhaust openings.

In the accompanying drawings the invention is illustrated by preferred examples.

Fig. 5 is a cross-section on the line II—II in Figure 1,

Figure 1:
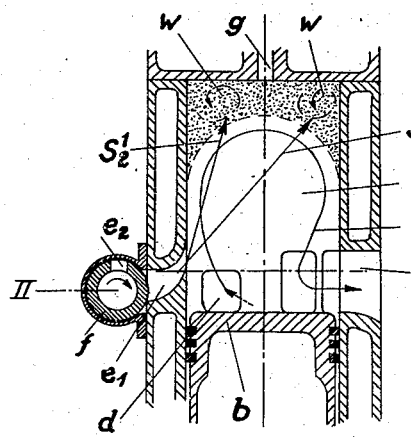
Fig. 1 is an axial section through the engine on the line I—I of Fig. 5.

Fig. 6 is an axial section similar to Figure 1 but showing an alternative arrangement, Fig. 7 is a cross-section on the line VII—VII of Figure 6, Fig. 8 is a section of a blower having a plurality of stages for supplying air separately to the main and additional scavenging ports respectively, Fig. 9 is an arrangement in which the suction effect of the exhaust gases escaping as a mass co-operates to assist the inflow of scavenging air and including an electrical blower drive which is regulated in dependence on the speed of the engine, and Fig. 10 is a fragmentary diagram showing an upwardly inclined arrangement of the main scavenging ports.

In the various figures of the drawings like references are used for like parts.

In Figures 1 and 5 of the drawings $a$ is the working space of the cylinder, $b$ the power piston shown in the lower dead-centre position, $c$ the exhaust ports, the exhaust pipe being suitably so constructed and dimensioned that at the operative speed of revolution a particularly strong suction effect is produced by the exhaust gases escaping as a mass, $d$ the main scavenging ports, $e_1$, $e_1^1$ the auxiliary scavenging ports and $f$ a distributor or rotary valve, through which the scavenging air flows centrally and through openings $e_2$, $e_2^1$ in which is conveyed at a definite moment to the scavenging ports $e_1$, $e_1^1$. In the cylinder head there may be provided at $g$ an injection nozzle, a precombustion chamber, a sparking plug or the like, according to whether the engine is a Diesel engine or a mixture compressing engine.

The main scavenging stream $S_1$ enters the cylinder at $d$ radially or tangentially (see Figure 5) with or without an upward inclination (see Figure 10) and is conveyed along a curved path, the direction of flow being for instance reversed prior to flowing towards the exhaust ports $c$. It is however hardly possible to prevent the formation of pockets W containing bodies of eddying combustion gases, which cannot or can only insufficiently be scavenged by the main scavenging stream. This exhaust gas residue which is not reached by the scavenging stream $S_1$ will occupy approximately the space bounded by the broken line.

For removing this exhaust gas residue the scavenging ports $e_1$, $e_1^1$ are directed at an upward inclination towards the peripheral corner of the cylinder space at the cylinder head, so that the eddying bodies of combustion gases are divided up (loosened or broken up) by the additional scavenging stream $S_2$, $S_2^1$. The admission of the auxiliary scavenging streams must be caused to take place at such a moment that the intermixed or layered exhaust gas residues can escape through the exhaust ports which are still open.

For obtaining the best scavenging result and the maximum effective power, the most suitable duration of opening, that is to say commencement and termination of opening, height and cross-section of the ports and the pressure of the additional scavenging air have a definite relation to one another, which itself depends on the dimensions of the engine, its speed of revolution, the dimensions of the exhaust pipe and the desired mean effective pressure.

Figure 2:
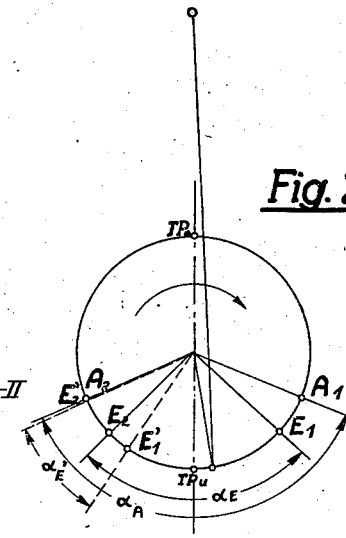
Fig. 2 is a control diagram.

In Fig. 2 a control diagram for the engine is shown. $\alpha_A$ between $A_1$ and $A_2$ is the opening angle of the exhaust ports $c$, $\alpha_E$ between $E_1$ and $E_2$ the opening angle for the main scavenging stream $S_1$ and $\alpha_E^1$ between $E_1^1$ and $E_2^1$ the opening angle for the additional scavenging stream $S_2$, $S_2^1$. Whereas the openings $d$ for the main scavenging stream are controlled only by the to and fro motion of the piston, the control of the inlet ports $e_1$, $e_1^1$ for the additional scavenging stream is effected on the one hand by the piston and on the other hand by the rotary valve $f$. The drive for the latter is made such that it will uncover the admission of the scavenging air to the inlet ports $e_1$, $e_1^1$ through the openings $e_2$, $e_2^1$ only at the end of the scavenging period of the main scavenging stream, the inlet period of the additional scavenging stream, as shown in Fig. 2, overlapping that of the main scavenging stream by a certain angle. The angle $\alpha_E^1$ is suitably about 30 to 60°. The ports for the additional scavenging stream may be closed simultaneously with, before or after the exhaust ports. When the inflow of the additional scavenging stream ceases later than the closing of the exhaust, supercharging is thereby obtained, which may be of advantage in certain circumstances.

The additional openings may also be disposed in the vicinity of the cylinder head at the periphery of the cylinder space as shown in Figure 6, in which case they will do away with the eddying bodies of combustion gases W, for instance by entering the cylinder space tangentially as shown in Figure 7.

Figure 3:
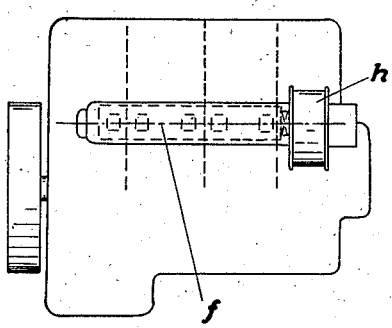
Fig. 3 is an elevation of the engine.

As will be seen from Fig. 3 the rotary control valve $f$ may be disposed co-axially with the compressor $h$ for the scavenging air, thus enabling the two parts to be jointly driven in a simple manner. Between the valve $f$ and the compressor $h$ a coupling may be provided (which may be capable of being disconnected).

Figure 4:
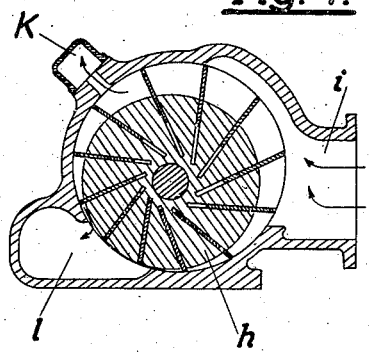
Fig. 4 is a section through a blower.

Fig. 4 shows a particularly suitable way of delivering the scavenging air for the main and the additional scavenging stream. In this case the blower $h$ is constructed as a rotary piston compressor, the air entering at $i$ into the casing of the compressor and being withdrawn at $k$ for the main scavenging stream and at $l$ for the additional scavenging stream. As will be seen the scavenging air withdrawn at $l$ is compressed to a considerably higher pressure than the main scavenging air withdrawn at $k$, which is of special advantage for the removal of the eddying bodies of combustion gases in the cylinder space. Suitably about two-thirds to three-quarters of the total quantity of scavenging air is used for the main scavenging stream and only the relatively small remainder for the additional scavenging. The additional scavenging air withdrawn at $l$ is conveyed to the rotary valve $f$ before it enters the cylinder space. With this arrangement it is possible with a single blower to obtain different scavenging pressures and a suitable distribution of the quantities of scavenging air to the main and the additional scavenging stream.

Both scavenging streams might, however, be produced independently of one another by different scavenging medium supplying means. In the constructional form shown in Figure 8 the blower is provided with a common rotor $m$ having two rows of blades $n_1$ and $n_2$, the one row $n_1$ delivering air to the pipe $o_1$ and the other to the pipe $o_2$. The air pressure in the pipe $o_1$ is lower than that in the pipe $o_2$ and leads to the scavenging ports $d$ while the pipe $o_2$ leads to the rotary valve $f$. Instead of a single compound blower as shown in Figure 8 a separate blower may be provided for each pipe $o_1$ and $o_2$, each blower having a single row of blades. The scavenging may, for example, be carried out in such a manner that the main scavenging stream is introduced into the cylinder by utilizing the depression left in the latter by the mass exit of the burnt gases. Such a constructional form is shown in Figure 9. It is known that by suitably proportioning the exhaust ports C and the exhaust pipe $c_1$ and by producing a sufficiently rapid opening of the exhaust ports the action can be obtained that the burnt gases in the cylinder $a$ will leave ballistically as a mass P and produce in the cylinder $a$ a vacuum which may be utilized for the introduction of the scavenging air, while the return of the burnt gases into the cylinder will be prevented or hindered by the fresh charge introduced therein. This phenomenon contributes considerably to the reduction of the load imposed on the blower shown in Figure 3 and Figure 9. Owing to this, on the one hand, a smaller blower can be employed and on the other hand the scavenging and charging can be improved, the output being increased in either case. In Figure 9, $p$ is an electric coupling to which current is supplied through a conductor $q$ from a battery $r$ which is charged by an electric generator $s$ driven by the engine. The current supply to the coupling can be regulated either by hand, by means of a switch $t$ or automatically in dependence on the speed of the engine. For this purpose a variable resistance $w$ is interposed in a shunt circuit $v$ which is bridged by the resistance $u$, the said variable resistance being under the control of a governor $x$ on the engine. On the speed increasing, the resistance in the conductor $q$ increases and consequently the current flowing to the coupling $p$ is weakened, whereby the blower $h$ is released by the coupling $p$ from its driving member on the engine. In this manner the blower output can be regulated in such a manner that it only comes into action within a predetermined lower speed range, while above this the scavenging is taken over wholly or in part by the withdrawal action of the outflowing exhaust gases which becomes more effective as the speed rises.

Further, two stroke engines in which a mixture is compressed may be provided with a double compressor in a similar manner to the arrangement shown in Figure 8, the one row of blades compressing scavenging air and the other row compressing mixture. In this case the scavenging air enters the cylinder through the main inlet ports while the mixture enters through the additional scavenging ports during the last 30° to 60° of the exhaust period.

In this case the mixture must of course be made richer than would normally be the case and provision must be made for thorough intermixing. The advantage of this arrangement is, that the scavenging can be made particularly effective, as mixture losses need not be taken into account and consequently a good mean pressure is obtained. Furthermore, by this separation the fuel consumption is reduced.

What I claim is:—

1. The method in operating internal combustion engines, which consists in introducing into the cylinder an initial scavenging stream, directed so as to flow across the cylinder, before the end of the power stroke but substantially after the beginning of the exhaust when the pressure in the cylinder has been materially reduced, introducing near the end of the exhaust an additional scavenging stream, directed to flow at an inclination towards the peripheral corners of the cylinder so as to cross or overlap the initial scavenging stream and give an additional impulse to the scavenging action towards the end of the scavenging period, interrupting the initial scavenging stream shortly after the introduction of the additional scavenging stream and continuing the additional stream during the continuance of the exhaust.

2. The method in operating internal combustion engines, which consists in introducing into the cylinder an initial scavenging stream, directed so as to flow across the cylinder, before the end of the power stroke but substantially after the beginning of the exhaust when the pressure in the cylinder has been materially reduced, introducing near the end of the exhaust an additional scavenging stream, directed to flow at an inclination towards the peripheral corners of the cylinder so as to cross or overlap the initial scavenging stream and give an additional impulse to the scavenging action towards the end of the scavenging period, interrupting the initial scavenging stream shortly after the introduction of the additional scavenging stream and continuing the additional stream during the continuance of the exhaust and for a short time after the termination of the exhaust.

3. The method as set forth in claim 1, in which the main scavenging stream is introduced into the cylinder with the aid of the suction effect of the exhaust gases escaping as a mass.

4. The method in operating internal combustion engines, which consists in introducing into the cylinder an initial scavenging stream, directed so as to flow across the cylinder, before the end of the power stroke but substantially after the beginning of the exhaust when the pressure in the cylinder has been materially reduced, introducing near the end of the exhaust an additional scavenging stream mixed with fuel, directed to flow at an inclination towards the peripheral corners of the cylinder so as to cross or overlap the initial scavenging stream and give an additional impulse to the scavenging action towards the end of the scavenging period, interrupting the initial scavenging stream shortly after the introduction of the additional scavenging stream and continuing the additional stream during the continuance of the exhaust.

5. An internal combustion engine cylinder provided with a plurality of admission ports arranged to open after the beginning of the exhaust but before the end of the power stroke, some of said ports being arranged so as to direct the incoming charge across the cylinder and to close substantially before the end of the exhaust and other of said ports extending towards the cylinder head beyond the first-mentioned ports and at an inclination towards the cylinder head so as to direct the incoming charge through said ports towards the peripheral corners of the cylinder space at the cylinder head and across or overlapping the incoming charge through the other ports and means co-operating with said second-mentioned ports including a valve, whereby said second-mentioned ports are opened shortly before the first-mentioned ports are closed and remain open during the continuance of the exhaust.

6. An internal combustion engine cylinder as set forth in claim 5, in which the ports which extend towards the cylinder head at an inclination thereto extend towards the cylinder head beyond the exhaust ports so as to remain open after the exhaust ports are closed.

7. The method in operating internal combustion engines, which consists in introducing into the cylinder an initial scavenging stream, directed so as to flow upwardly and across the cylinder, before the end of the power stroke but substantially after the beginning of the exhaust when the pressure in the cylinder has been materially reduced, introducing near the end of the exhaust an additional scavenging stream, directed to flow without rotation and at an inclination with respect to the cylinder axis towards the peripheral corners of the cylinder at the cylinder head so as to intersect the initial scavenging stream, interrupting the initial scavenging stream shortly after the introduction of the additional scavenging stream and continuing the additional scavenging stream during the continuance of the exhaust.

8. The method in operating internal combustion engines, which consists in introducing into the cylinder an initial scavenging stream, directed so as to flow upwardly and across the cylinder, before the end of the power stroke but substantially after the beginning of the exhaust when the pressure in the cylinder has been materially reduced, introducing near the end of the exhaust an additional scavenging stream at a higher pressure than the initial scavenging stream, directed to flow without rotation and at an inclination with respect to the cylinder axis towards the peripheral corners of the cylinder at the cylinder head so as to intersect the initial scavenging stream, interrupting the initial scavenging stream shortly after the introduction of the additional scavenging stream and continuing the additional scavenging stream during the continuance of the exhaust.

9. The method in operating internal combustion engines, which consists in introducing into the cylinder an initial scavenging stream, directed so as to flow across the cylinder, before the end of the power stroke but substantially after the beginning of the exhaust when the pressure in the cylinder has been materially reduced, introducing near the end of the exhaust an additional scavenging stream, directed to flow at an inclination towards the peripheral corners of the cylinder so as to cross or overlap the initial scavenging stream and give an additional impulse to the scavenging action towards the end of the scavenging period, interrupting the initial scavenging stream upon the introduction of the additional scavenging stream and continuing the additional stream during the continuance of the exhaust.

10. An internal combustion engine cylinder provided with a plurality of admission ports arranged to open after the beginning of the exhaust but before the end of the power stroke, some of said ports being arranged so as to direct the incoming charge across the cylinder and to close substantially before the end of the exhaust and other of said ports extending towards the cylinder head beyond the first-mentioned ports and at an inclination towards the cylinder head so as to direct the incoming charge through said ports without rotation about the cylinder axis towards the peripheral corners of the cylinder space at the cylinder head and across or overlapping the incoming charge through the other ports, and means co-operating with said second-mentioned ports including a valve, whereby said second-mentioned ports are opened shortly before the first-mentioned ports are closed and remain open during the continuance of the exhaust.

11. An internal combustion engine cylinder provided with exhaust ports and admission ports located in the cylinder wall in the neighbourhood of the lower dead centre of the piston, said admission ports being arranged so as to direct the incoming charge towards the cylinder head, so that the charge flows towards the cylinder head and its direction of flow is reversed before flowing towards the exhaust ports, and to close substantially before the end of the exhaust, additional admission ports located in the cylinder wall in the neighbourhood of the lower dead centre of the piston but extending towards the cylinder head beyond the first mentioned ports and at an inclination towards the cylinder head so as to direct the incoming charge through said ports without rotation about the cylinder axis towards the peripheral corner of the cylinder head and across or overlapping the incoming charge through the other ports, and means co-operating with said second-mentioned ports including a valve, whereby said second-mentioned ports are opened shortly before the first-mentioned ports are closed and remain open during the continuance of the exhaust.

ALFRED BOKEMÜLLER.